United States Patent [19]
Neier

[11] Patent Number: 6,007,008
[45] Date of Patent: Dec. 28, 1999

[54] FEED MIXER WITH DOUBLE FLIGHT CHOPPER AUGER

[75] Inventor: Benjamin R. Neier, Dodge City, Kans.

[73] Assignee: J-Star Industries, Inc., Ft. Atkinson, Wis.

[21] Appl. No.: 09/157,462

[22] Filed: Sep. 21, 1998

[51] Int. Cl.⁶ .................................................. B02C 19/22
[52] U.S. Cl. .................................. 241/101.8; 241/260.1; 241/605
[58] Field of Search ...................... 366/319, 323, 366/603; 241/260.1, 261, 101.8, 605

[56] References Cited

U.S. PATENT DOCUMENTS

| | | |
|---|---|---|
| 3,138,167 | 6/1964 | Fisher .......................................... 366/603 |
| 5,143,310 | 9/1992 | Neier . |
| 5,299,865 | 4/1994 | Presnell ........................................ 366/319 |

FOREIGN PATENT DOCUMENTS 2255517  11/1992  United Kingdom ................ 241/260.1

Primary Examiner—Mark Rosenbaum
Attorney, Agent, or Firm—Zarley, Thomte, Voorhees & Sease

[57] ABSTRACT

A feed mixer comprising a plurality of mixing members wherein each mixing member is longitudinally mounted for rotation about an axis and at least one of the mixing members further comprises a chopper auger having double flighting. The double flighting may have similar or different outer diameters. The double flighting may further provide chopping knives, or sickle knives, on the outer peripheral edge of at least one of the flightings.

17 Claims, 3 Drawing Sheets

FEED MIXER WITH DOUBLE FLIGHT CHOPPER AUGER

BACKGROUND OF THE INVENTION

Forage and grain crops are common components of livestock feed. While these components may be utilized independently, it is frequently preferable to provide a mixture of feed stuff such as hay with grain or other fluent materials. Several mixers have been developed for this purpose. A very successful mixer for fluent and non-fluent material is disclosed in previously issued patents of which I am a co-inventor or sole inventor, U.S. Pat. No. 4,506,990, issued Mar. 26, 1985; U.S. Pat. No. 4,597,672, issued Jul. 1, 1986 and U.S. Pat. No. 4,756,626, issued Jul. 12, 1988. The mixers of these patents include a rotor and a main mixing chamber next to vertically stacked augers in an auxiliary side chamber. The material is moved from one end of the auxiliary chamber to the other in opposite directions and is continuously cycled from the main chamber into the auxiliary chamber. The mixing action is more extensively described in these patents.

The mixer of these patents will mix fluent material with non-fluent material such as hay. Hay is more difficult to mix with fluent material as it is necessary that the hay be left in the mixer for extended periods of time until it has been sufficiently chopped or shredded. Also, it is often desirable to put hay bales of varying sizes into the mixer for mixing with the fluent materials. I invented an improved mixer that would allow for a faster more efficient way of chopping or processing baled hay of different sizes with the fluent materials. This improved mixer is the subject of U.S. Pat. No. 5,143,310, issued Sep. 1, 1992.

While the prior art mixers supply an efficient means for mixing fluent with non-fluent material, there remains a need to significantly increase the speed of the mixing and cutting process. In addition, the prior art mixers allow a certain amount of flakes, or small portions of hay, to fall between the flights on the auger; these smaller portions of hay then go into the rotor chamber without getting cut completely. What is needed is an even faster, more efficient means of chopping or processing hay, or other similar non-fluent material, for mixing with the fluent materials and that further reduces the amount of flakes of hay that fall between the flights of the chopper auger and ride to the end of the mixer without getting cut with the knives. In addition, what is needed is a means of cutting hay into the mixture while still allowing other feed additives, such as silage, to be added while still obtaining a proper level of mixing at the same auger speed.

SUMMARY OF THE INVENTION

It has been found that by placing a second flight on the chopper auger it is now possible to move the same amount of feed at the same auger speed while making the area between the flights one half the size so large flakes of hay cannot fall between the flights without first being chopped to a smaller size. This also has the additional advantage of holding the hay on top of the auger until it is cut up by the knives. Further, a closer spacing between flights keeps the smaller chunks of hay from falling between the flighting spaces and riding to the end of the mixer without getting cut with the knives. By using a double set of flights on the chopper auger, different thicknesses in flighting can be utilized. In addition, the double flighting allows for another objective to be met through the use of different outer diameters of the flighting. For example, a larger outer diameter flighting used in conjunction with a smaller outer diameter flighting works well in the mixing of feed additives with the hay. In a mixer utilizing two different sized flightings, knives can be attached to the larger diameter flighting, where the larger diameter flighting gives a faster surface speed on the knives with the same auger speed providing greatly improved cutting action. By using a smaller diameter on the second row of flight, the hay is held up until cut with the knives attached to the larger flighting. In addition, this arrangement of double flighting of different diameters allows other feed additives such as silage to fall into the auger more easily to provide the necessary movement to the end of the mixer for a proper leveling while mixing.

The double flight chopper auger of the feed mixer of this invention is adaptable for use on not only the mixer disclosed in this application, but one of ordinary skill in the art could adapt it to feed mixers of a more conventional design.

DETAILED DESCRIPTION OF THE PREFERRED EMBODIMENT

Figure 1:
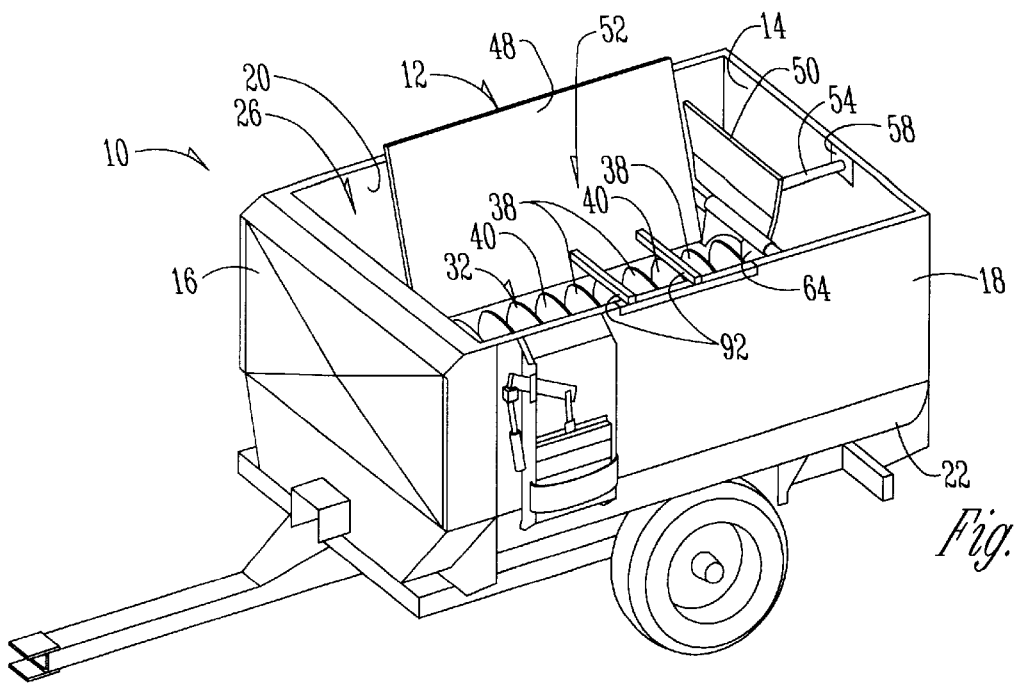
FIG. 1 is a perspective view of a feed mixer which includes the double flight auger of this invention.

A mixer 10 is shown in FIG. 1 which includes the hay feed system attachment 12 and the improved double flight auger 32 of this invention.

Figure 2:
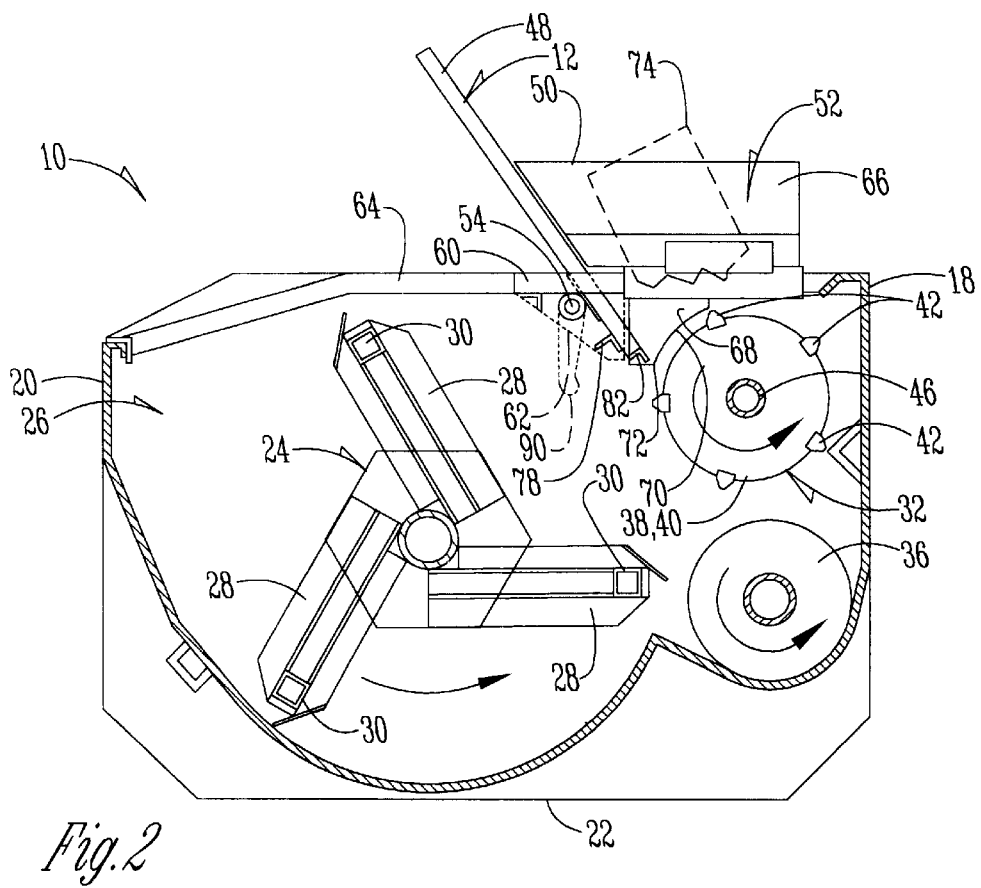
FIG. 2 is a cross sectional view taken along line 2—2 in FIG. 3.

The mixer 10 includes opposite end walls 14 and 16, opposite side walls 18 and 20 and a bottom wall 22. FIG. 2 shows a rotor 24 positioned in a main chamber 26 and includes rotor arms 28 which have rotor bars 30 extending therebetween. A chopping and mixing auger 32 is positioned in an auxiliary chamber 34 above a lower mixing auger 36. The chopper auger 32 includes a first flighting 38 and a second flighting 40 having spaced apart sickle knives 42 on the outer edge of the first flighting 38 with a spacing of one or more knives for each 360°. Paddles 44 are provided on the shaft 46 of the chopper auger 32 as seen in FIG. 3 and FIG. 4 for stirring the material and distributing it throughout the mixing chambers 26 and 34.

Figure 3:
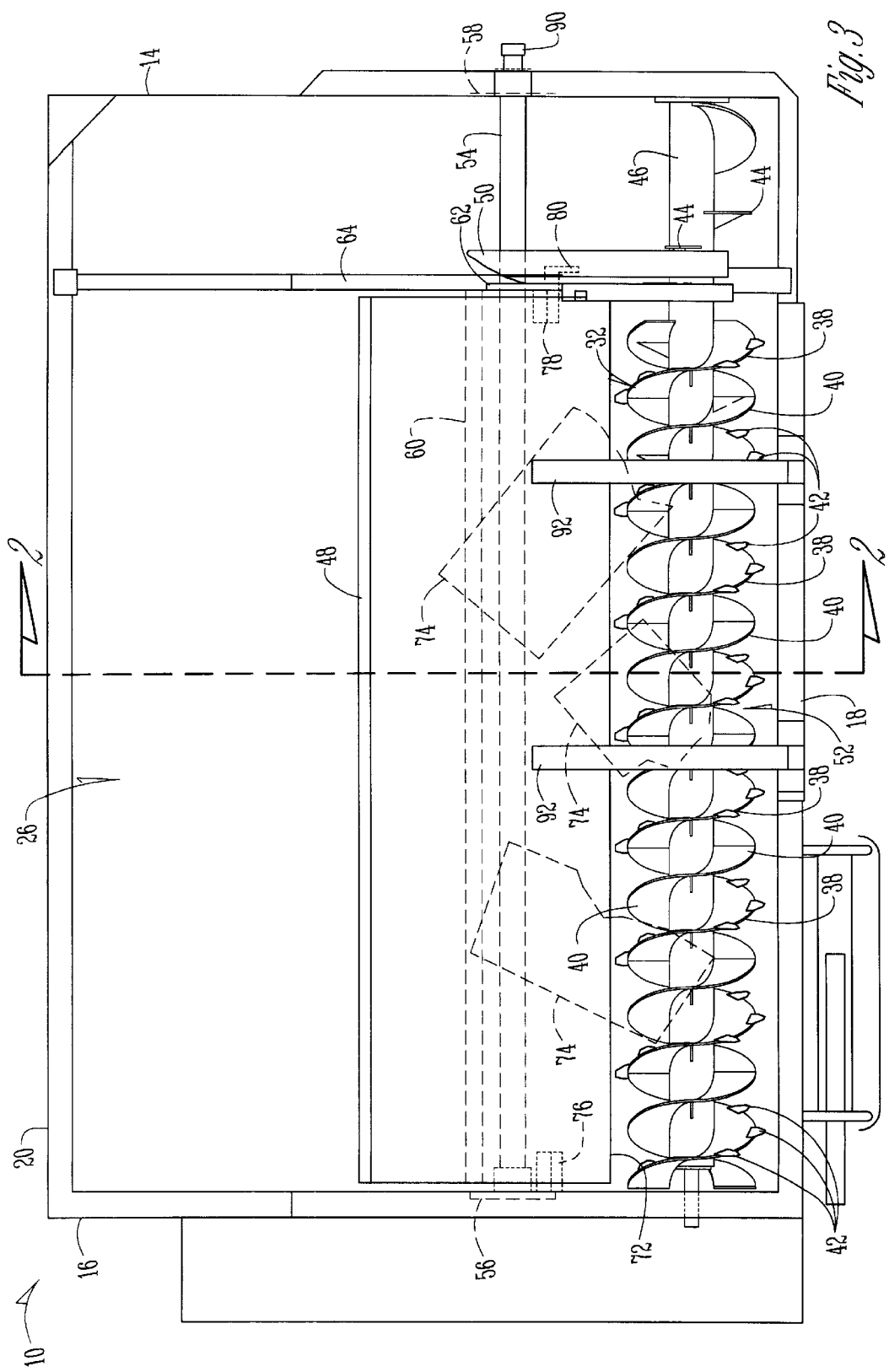
FIG. 3 is a top plan view of FIG. 1. This view shows a double flight chopper auger wherein both flights are the same diameter.
Figure 4:
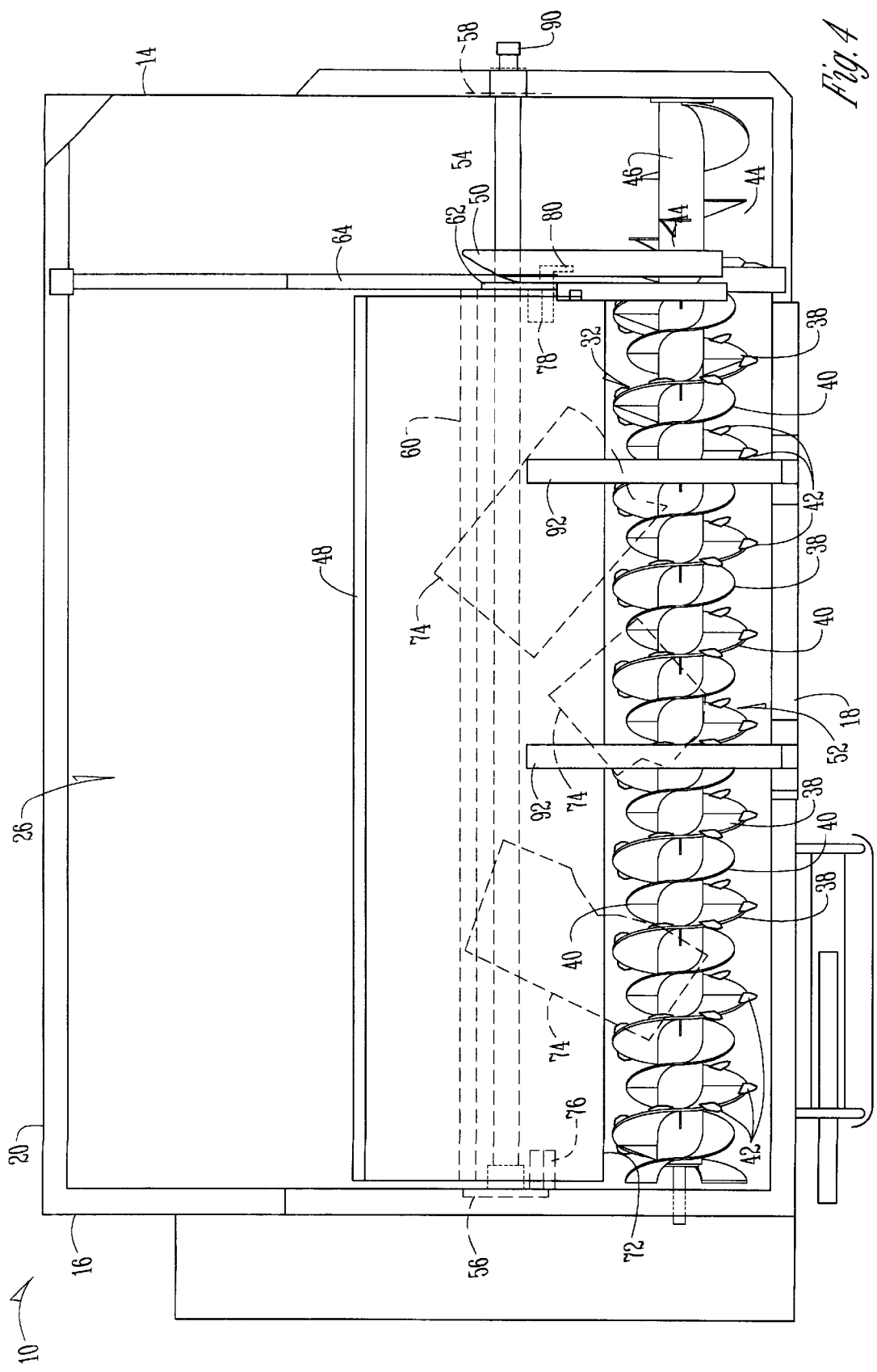
FIG. 4 is a top plan view of FIG. 1. This figure shows an embodiment of the double flight auger wherein the flights are of differing diameter.

The hay feed system attachment 12 includes a feed wall 48 extending longitudinally of the mixer 10 and a control wall 50 extending laterally of the auxiliary chamber 34 to define in cooperation with the side wall 18 a hay chopping chamber 52 as seen in FIG. 3 and FIG. 4. The hay chopping chamber 52 is in the upper region of the auxiliary chamber 34 where the chopper auger 32 is positioned.

The feed wall 48 is mounted on a pivot shaft frame member 54 extending between the opposite end walls 14 and 16 of the mixer 10. A mounting end plate 56 secures the pivot shaft 54 to the end wall 16 as does a mounting plate 58 connects the opposite end to the end wall 14. A second longitudinal frame member 60 extends between the mounting end plate 56 and a support plate 62 through which the pivot shaft 54 extends as seen in FIG. 3 and FIG. 4. The support plate 62 is connected to a transversely extending frame member 64 extending between the mixer side walls 18 and 20. The control wall 50 is pivotally mounted on the frame member 64 and includes an upper portion 66 and a lower portion 68 which includes a concave downwardly edge 70 to conform to the convex shape of the chopper auger 32 as seen in FIG. 2. The lower edge 72 of the feed wall 48 is also positioned closely adjacent to the periphery of the chopper auger 32 to assure that hay bales 74 are fed through the chopper auger 32 before the hay reaches the lower mixing auger 36 or rotor 24.

A stop 76 is provided on the mounting end plate 56 and a stop 78 is provided on the support plate 62 to limit pivotal movement of the feed wall 48 beyond the upstanding position illustrated in the drawings. It is seen, however, that the feed wall 48 extends downwardly and laterally towards the side wall 18 and the chopper auger 32. A stop plate 80 extends laterally outward from the support plate 62 to limit pivotal movement to the control wall 50 beyond a substantially vertical position. For cost savings the feed wall can also be fixed in the up position where overall height is not a problem.

Cooperation between the pivotal movement of the feed wall 48 and the control wall 50 results from the lower corner of the feed wall 48 adjacent to the control wall 50 engaging the lower portion 68 of the control wall 50 when the feed wall 48 and control wall 50 are both in their horizontal positions. Pivotal movement to a raised position of the feed wall 48 causes the control wall 50 to also pivot to a substantially vertical position. A block 82 is mounted on the lower corner of the feed wall 48 and provides the contact with the lower portion 68 of the control wall 50 as seen in FIG. 2. Operation of the pivoting of the feed wall 48 and control wall 50 can be accomplished through use of a winch and cable or a hydraulic cylinder. Further, the feed wall 48 and the control wall 50 may be constructed in a fixed vertical position.

The desired amount of chopping action on the hay bales 74 when in the hay chopping chamber 52 is determined by: the speed of the chopper auger 32; the number of sickle knives 42 used on each 360° rotation of the double flightings 38 and 40 of the chopping auger 32; the pitch of the flightings 38 and 40 which affects the length of time the hay is in the hay chopping chamber 52; the outer diameter of the flightings 30 and 40; and the diameter of the tubing on which the auger flightings are mounted. A pair of control arms 92 are removably mounted on the top edge of the side wall 18 and extend over the chopper auger 32 to restrict of the hay by the chopper auger 32. The control wall 50 restricts flow of hay over the top of the chopper auger 32, once the hay has been chopped into small enough pieces to pass through the chopper auger 32 or under the control wall 50, it is acted upon by the paddles 44 as seen in FIG. 3 and FIG. 4 where upon it is distributed downwardly to the mixing auger 36 and laterally into the main chamber 26 for further mixing action by the rotor 24.

FIG. 3 and FIG. 4 show alternate preferred embodiments of the present invention. FIG. 3 shows the use of double flightings 38 and 40 of similar outer diameter wherein the sickle knives 42 are attached to the outer edge of the first flighting 38. FIG. 4 shows an alternate embodiment wherein the outer diameter of the first flighting 38 and the second flighting 40 are different. The first flighting 38 has the larger diameter and further has sickle knives 42 attached to the outer edge as seen in FIG. 4. This larger diameter flighting 38 gives a faster surface speed on the knives with the same auger speed as that of a flighting with a lesser diameter. By utilizing a smaller diameter on the second flighting 40 the bale of hay 74 is held up until cut with the knives and also allows other feed additives to fall into the chopper auger 32 and ultimately to the lower mixing auger 36 to get the necessary movement to the end of the mixers for proper leveling while mixing.

In a more preferred embodiment, the chopper auger 32 of FIG. 3 provides double flighting 38 and 40 of similar outer diameter of 16 inches and a pitch of 14 inches. The first flighting 38 having 8 pitches of ⅜ inch thickness. The second flighting 40 having 8 pitches of ¼ inch thickness. The first flighting 38 further having spaced apart sickle knives 42 on the outer edge with a spacing of one or more knives for each 360°. In addition, the second flighting 40 may also have spaced apart sickle knives 42 on the outer edge with a spacing of one ore more knives for each 360°.

In another preferred embodiment, the chopper auger 32 of FIG. 4 provides double flighting 38 and 40 of differing outer diameter. The first flighting 38 having a 20 inch outer diameter on a pitch of 14 inches. The first flighting 38 further having a ⅜ inch thickness and spaced apart sickle knives 42 on the outer edge with a spacing of one ore more knives for each 360°. The second flighting 40 having a 16 inch outer diameter and a pitch of 14 inches. The second flighting also having a thickness of ¼ inch. In addition, the second flighting 40 may also have spaced apart sickle knives 42 on the outer edge with a spacing of one or more knives for each 360°.

It is to be understood that the application of the teachings of the present invention to a specific problem or apparatus will be within the capabilities of one having ordinary skill in the art in light of the teachings contained herein.

What is claimed is:

1. A feed mixer comprising:
   a housing forming a mixing chamber having opposite end walls, opposite side walls, a bottom wall, and an upwardly facing opening;
   a plurality of mixing members mounted in said mixing chamber wherein each of said mixing members is mounted for rotation about an axis; and
   at least one of said mixing members further comprising a chopper auger having double flighting thereon;
   a hay feed system in said mixing chamber adjacent said chopper auger for channeling hay into said chopper auger.

2. A feed mixer according to claim 1 wherein said double flighting includes at least one flighting having an outer edge with a series of knives mounted on the outer edge of said flighting.

3. A feed mixer according to claim 1 wherein said double flighting includes a first flighting and a second flighting, said first flighting having an outer diameter greater than said second flighting.

4. A feed mixer according to claim 1 wherein said double flighting includes a first flighting and a second flighting, said first flighting and said second flighting being of the same outer diameter.

5. A feed mixer comprising:
   a chamber having upper and lower zones, opposite side walls, a bottom wall and an open top;
   at least one mixing member in the lower zone of said chamber;
   a longitudinally extending chopper auger in the upper zone of said chamber, said chopper auger having double flighting thereon; and
   a hay feed system in the upper zone of said chamber adjacent said chopper auger for channeling hay into hay chopper auger.

6. The structure of claim 5 wherein said double flighting includes a first flighting, and a second flighting, said first and second flighting being of the same diameter.

7. The structure of claim 5 wherein said double flighting includes a first flighting and a second flighting, said first flighting having a greater diameter than said second flighting.

8. The structure of claim 5 wherein said double flighting further comprises:

a first flighting and a second flighting, wherein said first and second flighting each have an outer edge; and at least one of said first and second flighting has a series of knives mounted on said outer edge of said first or said second flighting.

9. The structure of claim 5 wherein said hay feed system includes a feed wall extending longitudinally of and upwardly from said chopper auger and is positioned between said opposite side walls of said chamber.

10. The structure of claim 9 wherein said feed wall has a lower longitudinal edge positioned closely adjacent to said hay chopper auger along the length of said feed wall.

11. The structure of claim 10 wherein said hay chopper auger is positioned adjacent one of said opposite side walls and said feed wall is positioned on the opposite side of said hay chopper auger from said one side wall.

12. The structure of claim 11 wherein said feed wall is disposed at an angle to a vertical plane and extends downwardly towards said hay chopper and said one side wall.

13. The structure according to claim 12 wherein said feed wall extends substantially above said open top of said chamber.

14. A feed mixer comprising:

a housing forming a mixing chamber having opposite end walls, opposite side walls, a bottom wall, and an upwardly facing opening;

a first, a second and a third mixing member mounted in said mixing chamber for rotation about a first, a second, and a third axis, respectively;

said first mixing member having a diameter which is greater than said second and said third mixing members;

said second mixing member being positioned laterally of said first mixing member;

said third mixing member being positioned above said second mixing member, and comprising a chopper auger having double flighting thereon;

a hay feed system connected to said housing adjacent said chopper auger for channeling hay into said hay chopper auger.

15. A feeder mixer according to claim 14 wherein said chopper auger having double flighting includes a first flighting and a second flighting, said first and second flighting being of the same diameter.

16. A feeder mixer according to claim 14 wherein said chopper auger having double flighting includes a first flighting and a second flighting, said first flighting having a greater diameter than said second flighting.

17. A feeder mixer according to claim 14 wherein said chopper auger having double flighting further comprises:

a first flighting and a second flighting, wherein said first and second flighting each have an outer edge; and at least one of said first and second flighting has a series of knives mounted on said outer edge of said first or said second flighting.

* * * * *